US 6,676,028 B2

(12) United States Patent  
Jacobson

(10) Patent No.: US 6,676,028 B2
(45) Date of Patent: Jan. 13, 2004

(54) ELECTRICAL RESISTANCE FOOT WARMER FOR USE WITH A MOTOR VEHICLE

(76) Inventor: Howard Jacobson, 280 N. Old Woodward, Suite 217, Birmingham, MI (US) 48009

( * ) Notice: Subject to any disclaimer, the term of this patent is extended or adjusted under 35 U.S.C. 154(b) by 0 days.

(21) Appl. No.: 10/128,171

(22) Filed: Apr. 23, 2002

(65) Prior Publication Data

US 2002/0175216 A1 Nov. 28, 2002

Related U.S. Application Data

(60) Provisional application No. 60/285,787, filed on Apr. 23, 2001.

(51) Int. Cl.[7] ................................................. F24H 3/00
(52) U.S. Cl. ......................................... 237/77; 219/202
(58) Field of Search ............................ 237/77, 12.3 R; 219/202, 528

(56) References Cited

U.S. PATENT DOCUMENTS

| | | | |
|---|---|---|---|
| 1,202,605 A | * | 10/1916 | Storm ........................ 126/204 |
| 4,122,084 A | | 10/1978 | Douglass ............... 260/294.8 J |
| 4,159,714 A | * | 7/1979 | Peterson et al. ............. 601/15 |
| 4,587,402 A | * | 5/1986 | Nishino et al. ............. 338/308 |
| 4,653,729 A | | 3/1987 | Ando ...................... 237/12.3 B |
| 4,817,707 A | | 4/1989 | Aoyama et al. .............. 165/46 |
| 4,972,901 A | | 11/1990 | Hormansdorfer ............ 165/41 |
| 5,251,689 A | | 10/1993 | Hakim-Elahi ................ 165/46 |
| 5,466,456 A | | 11/1995 | Glover ........................ 424/401 |
| 5,557,807 A | * | 9/1996 | Hujar et al. ................. 2/171.2 |
| 5,605,642 A | * | 2/1997 | Nece .......................... 219/202 |
| 5,652,570 A | | 7/1997 | Lepkofker ................... 340/573 |
| 5,675,630 A | | 10/1997 | Beatty ......................... 379/59 |
| 5,689,547 A | | 11/1997 | Molne ......................... 379/58 |
| 5,705,980 A | | 1/1998 | Shapiro ....................... 340/539 |
| 5,712,619 A | | 1/1998 | Simkin ........................ 340/539 |
| 5,731,757 A | | 3/1998 | Layson, Jr. ................. 340/573 |
| 5,742,233 A | | 4/1998 | Hoffman et al. ............ 340/573 |
| 5,926,769 A | | 7/1999 | Valimaa et al. ............. 455/564 |
| 5,927,381 A | | 7/1999 | Bednarek et al. ............. 165/41 |
| 5,985,300 A | | 11/1999 | Crotty et al. ................ 424/402 |
| 6,028,514 A | | 2/2000 | Lemelson et al. .......... 340/539 |
| 6,049,063 A | * | 4/2000 | Barber ........................ 219/213 |
| 6,058,183 A | | 5/2000 | Draganoff ................... 379/354 |
| 6,078,026 A | * | 6/2000 | West ........................... 219/212 |
| 6,085,105 A | | 7/2000 | Becher ........................ 455/517 |
| 6,147,611 A | | 11/2000 | Otero .......................... 340/574 |
| 6,161,025 A | | 12/2000 | Chiu ........................... 455/565 |
| 6,163,596 A | | 12/2000 | Gelfer et al. ............... 379/67.1 |
| 6,174,536 B1 | | 1/2001 | Crotty et al. ................ 424/402 |
| 6,277,142 B1 | * | 8/2001 | Pinter ............................ 607/1 |

* cited by examiner

Primary Examiner—Derek Boles
(74) Attorney, Agent, or Firm—Gifford, Krass, Groh, Sprinkle, Anderson & Citkowski, P.C.

(57) ABSTRACT

A portable foot warming device for use with a vehicle. The device includes a rubberized, heat transferring and electrically insulating pad having a specified three dimensional shape with a specified length, width and thickness. An electrically conductive and resistant heat generating coil is embedded within the pad and extends therethrough in a desired configuration. A circuit unit is attached to the pad and supplies the heat generating coil. A cord extends from a voltage input to the circuit unit and in order to power the unit.

4 Claims, 4 Drawing Sheets

ELECTRICAL RESISTANCE FOOT WARMER FOR USE WITH A MOTOR VEHICLE

CROSS REFERENCE TO RELATED APPLICATIONS

The present application claims priority from U.S. Provisional Application Serial No. 60/285,787, filed on Apr. 23, 2001, and entitled Electrical Resistance Foot Warmer for Use With a Motor Vehicle.

BACKGROUND OF THE INVENTION

1. Field of the Invention

The present invention relates generally to personal heating devices for use in a motor vehicle. More specifically, the present invention discloses a resistance heat generating foot pad for use by an operator or passenger within a motor vehicle.

2. Description of the Prior Art

Examples of vehicle heater/foot warmer devices are known in the art. U.S. Pat. No. 5,927,381, issued to Bednarek et al., teaches a latent heat storage device installed in the area of the front passenger's foot space. A heating circulation system has a heater exchanger through which heat from a flowing liquid is convected, and such as may be transferred from a coolant liquid passed previously through an internal combustion engine. A forward flow pipe and return flow pipe for the pre-heated coolant is arranged laterally on the latent heat storage device by couplings. The latent heat storage device, such as may be called a phase change material device, can be switched into a heating circuit and liquid circulation may take place through the heat exchanger and the latent heat storage device by way of a circulating pump which can be driven independently of the engine and by switch-over valves.

U.S. Pat. No. 4,653,729, issued to Ando, teaches a foot warmer for use in a car and which includes a heat insulating material with a concave groove formed in one surface thereof. A heat radiating sheet is connected to the surface on which the groove is formed and a tube is disposed in the groove to transfer heat from water flowing therein to the heat radiating sheet. The groove may further be defined in a meandering pattern or with a plurality of parallel spaced grooves.

SUMMARY OF THE PRESENT INVENTION

A portable foot warming device for use with a vehicle. The device includes a rubberized, heat transferring and electrically insulating pad having a specified three dimensional shape with a specified length, width and thickness. An electrically conductive and resistant heat generating coil is embedded within the pad and extends therethrough in a desired configuration. A circuit unit is attached to the pad and supplies the heat generating coil. A cord extends from a voltage input to the circuit unit and in order to power the unit.

Additional features include the pad having at least one rubberized layer of material, the selected rubberized layer of material further including in one preferred variant a reflective coating layer. Another variant of the invention contemplates the rubberized pad further being provided as first and second slippers, each incorporating a separate resistance generating coil. In further preferred applications, it is also disclosed that the rubberized pad may be applied to the vehicle's steering wheel pad, brake pedal pad and accelerator pedal pad.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
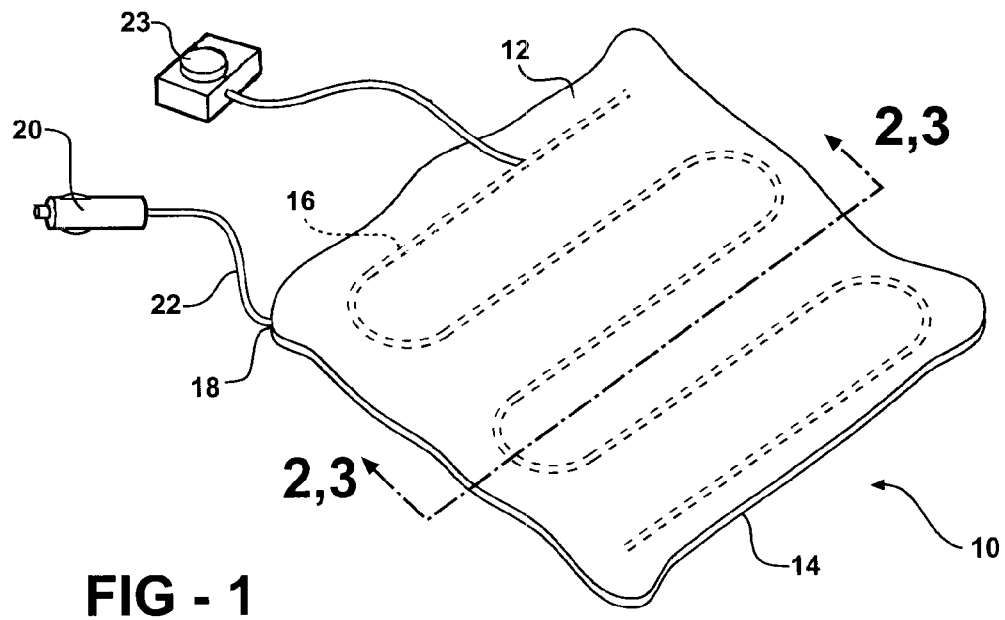
FIG. 1 is a perspective view of the electrical resistance foot warmer according to a first preferred embodiment of the present invention.

Referring now to FIG. 1, an electrical resistance coil heating device is illustrated at 10 according to a first preferred embodiment of the present invention and which is incorporated into a foot pad warmer for use within a vehicle. The concept behind the present invention is the provision of a warming device for at least the user's feet and which is an improvement over the prior art in that it utilizes more efficient electrical resistance heat, and as opposed to relying upon heat transfer resulting from a fluid routed in conduit fashion through the vehicle power train system.

It has also been found that such prior art heat transfer systems are marginally effective at best and, while taking advantage of existing heat generated in emanating fashion from the vehicle engine, require significant investments in equipment and retrofit of such vehicles, the net effect being the impracticality of incorporating of such warming and heat transfer devices into existing vehicles. The present invention, on the other hand, provides a convenient heat warming device which may be purchased separately and quickly and easily installed in the vehicle (such as to the cigarette lighter or to an existing fuse in the vehicle's electrical system) with a minimum of effort and a maximum of effect.

Figure 2:
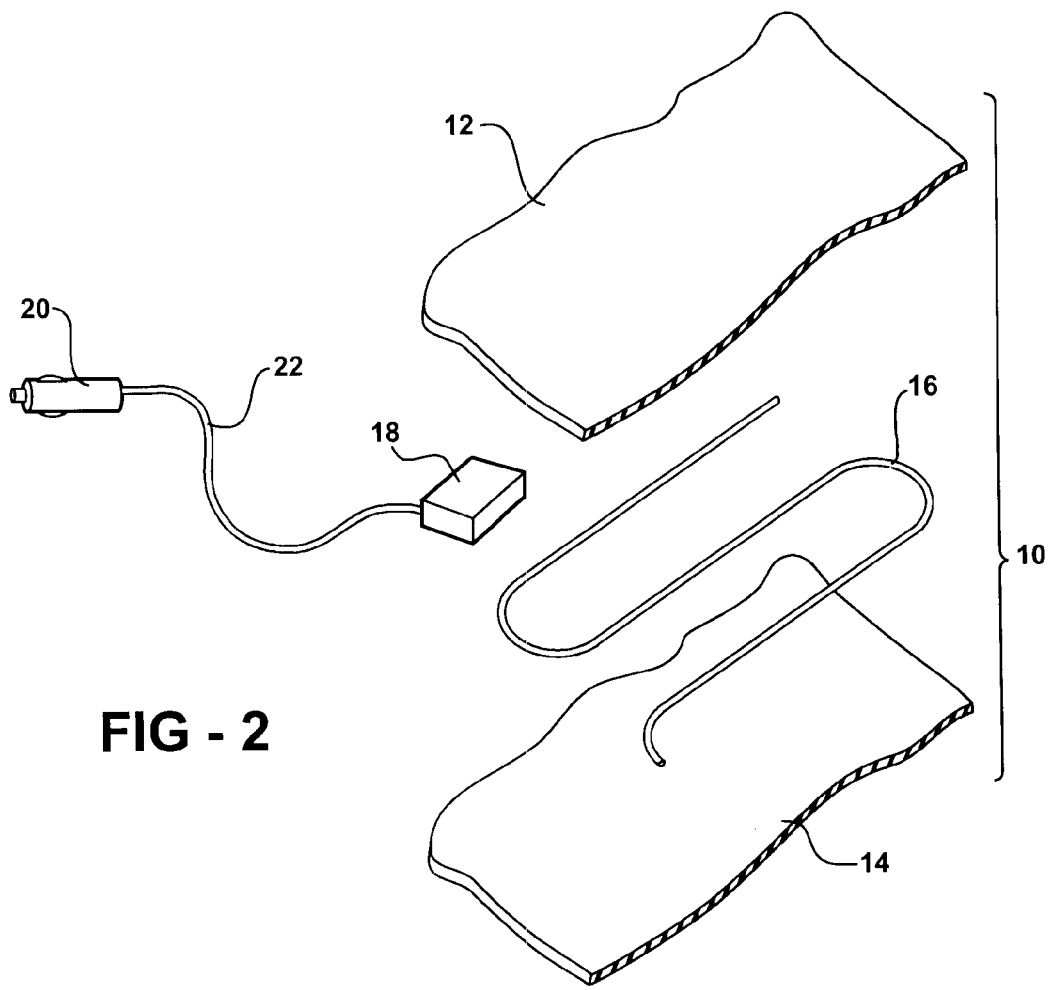
FIG. 2 is a cutaway view taken along line 2—2 of FIG. 1 and illustrating, in exploded fashion, the components of the foot warmer according to the first preferred embodiment and which includes upper and lower rubberized mat layers sandwiching therebetween a resistance heat generating coil.

Referring again to FIG. 1, and also to FIG. 2, the foot warmer 10 according to the first preferred variant includes a rubberized mat construction. Preferably, the mat is constructed of first 12 upper and second 14 lower mat layers and which are constructed of rubber or other suitable heat transferable and electrically insulated material. The mat layers may further be constructed in any shape desirable, such as a generally rectangular configuration which is best suited for application to a vehicle floor and it is also envisioned that the mat layers may be removable or, in certain application such as during the manufacture of the vehicle, fixedly secured to the floor. It is also contemplated that the mat construction of the warmer 10 can substitute for a typical vehicle floor mat, and such as may be positioned on the floor below the vehicle operator or any of the vehicle passengers and within the scope of the instant invention.

Disposed between the layers 12 and 14 of the rubberized mat construction is a wire resistor coil 16. The coil 16 operates to dissipate resistance created from a circuit located at unit 18 positioned at an edge location of the warmer mat 10. The generation of heat as a byproduct of electrical resistance is very well conventionally known, such as through the application of basic tenets of electrical technology and in particular Ohm's law (Voltage=Current× Resistance). Accordingly, further discussion is not required as to the practicality of generating heat through a resistor coil.

A voltage power supply is provided in the form of an input 20 to the vehicle's cigarette lighter (not shown) and is connected to the circuit unit 18 through cord 22. As previously described, the voltage input can be provided by attaching an end of the cord 22 (such as its positive, negative and ground wires) to an existing fuse within the vehicle's electrical system (see in FIG. 4).

An on/off and adjustment knob 23 may be provided for easy access by the user and to operate the system. It is also envisioned that, for original vehicle manufacture applications incorporating this system, the knob may be incorporated into the dashboard assembly of the vehicle as part of such original manufacture.

Figure 3:
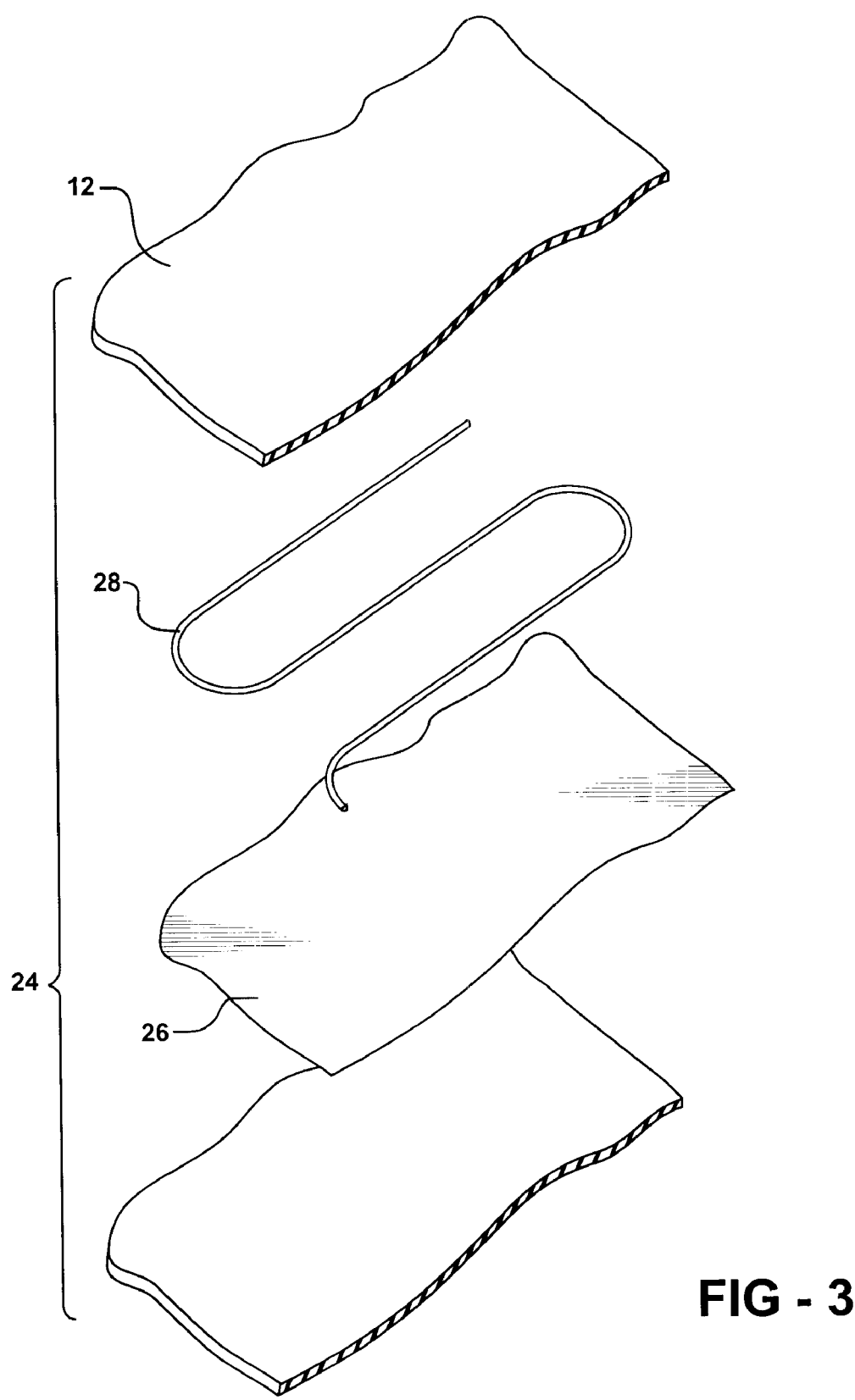
FIG. 3 is a view similar to that illustrated in FIG. 2 and showing a variation of the foot warmer device and which incorporates a reflective sheet defined along an inward and upper facing surface of the lower mat construction.

Referring to FIG. 3, a further preferred variant of the first general embodiment is illustrated at 24 and again includes the upper rubberized mat 12 and resistor coil 16 drawn from the first embodiment. The lower mat layer is identified at 26 and, contrary to the first variant, includes a rubberized construction with a reflective coating layer defined on an upper and opposing face in contact with both the resistance generating coil and upper mat layer 12. It is further contemplated that the resistance generating element can be constructed either again as a winding coil (see at 16) or, alternatively, as a stackable template sheet 28. It is contemplated that a plurality of differently configured template sheets can be substituted for achieving desired heating patterns within the mat construction 24.

Figure 4:
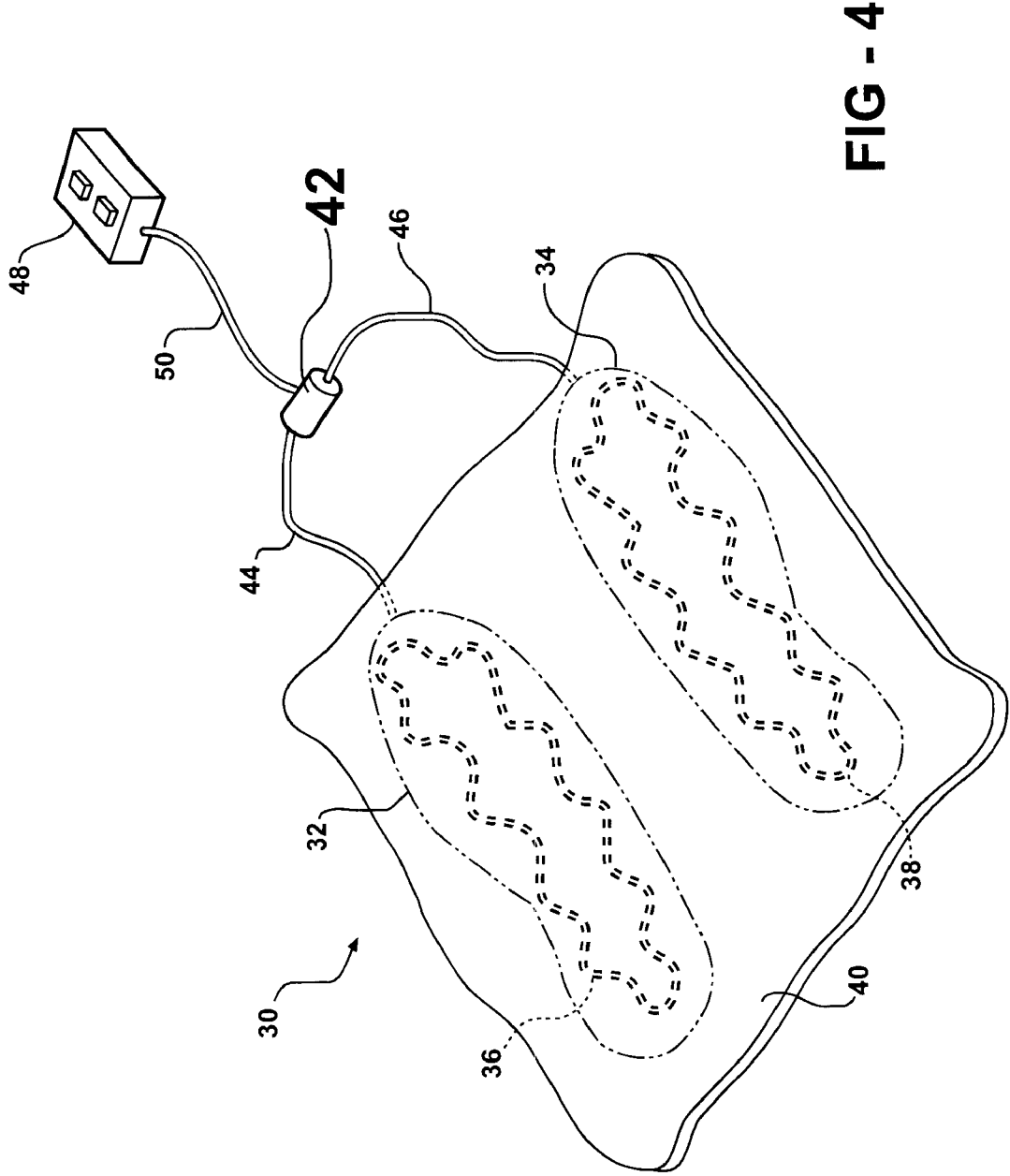
FIG. 4 is a view of a further proposed variant and which includes a pair of slippers into which are constructed the resistance foot warming coils.

Referring to FIG. 4, a yet further configuration 30 of the present invention contemplates the provision of first 32 and second 34 slipper shaped warmer elements. Each slipper 32 and 34 may include a resistance coil extending therearound and defined in a desired extending fashion (see at 36 and 38, respectively). As with the first preferred embodiments, the coils 36 and 38 may be configured to deliver resistance heat and the slippers 32 and 34 may either be worn by the operator of the vehicle (such as by first removing the operator's shoes).

Alternatively, the slippers 32 and 34 may be secured directly upon a mat pad 40 (or to the vehicle's accelerator and brake pedals) for use by an occupant/passenger within the vehicle. Additional features again include connecting lines 44 and 46 extending, respectively, from a resistance circuit-generating unit 42, as well as a fuse 48 (forming a part of the vehicle) and which serves a voltage source for supplying line 50 extending to the unit 42.

Figure 5:
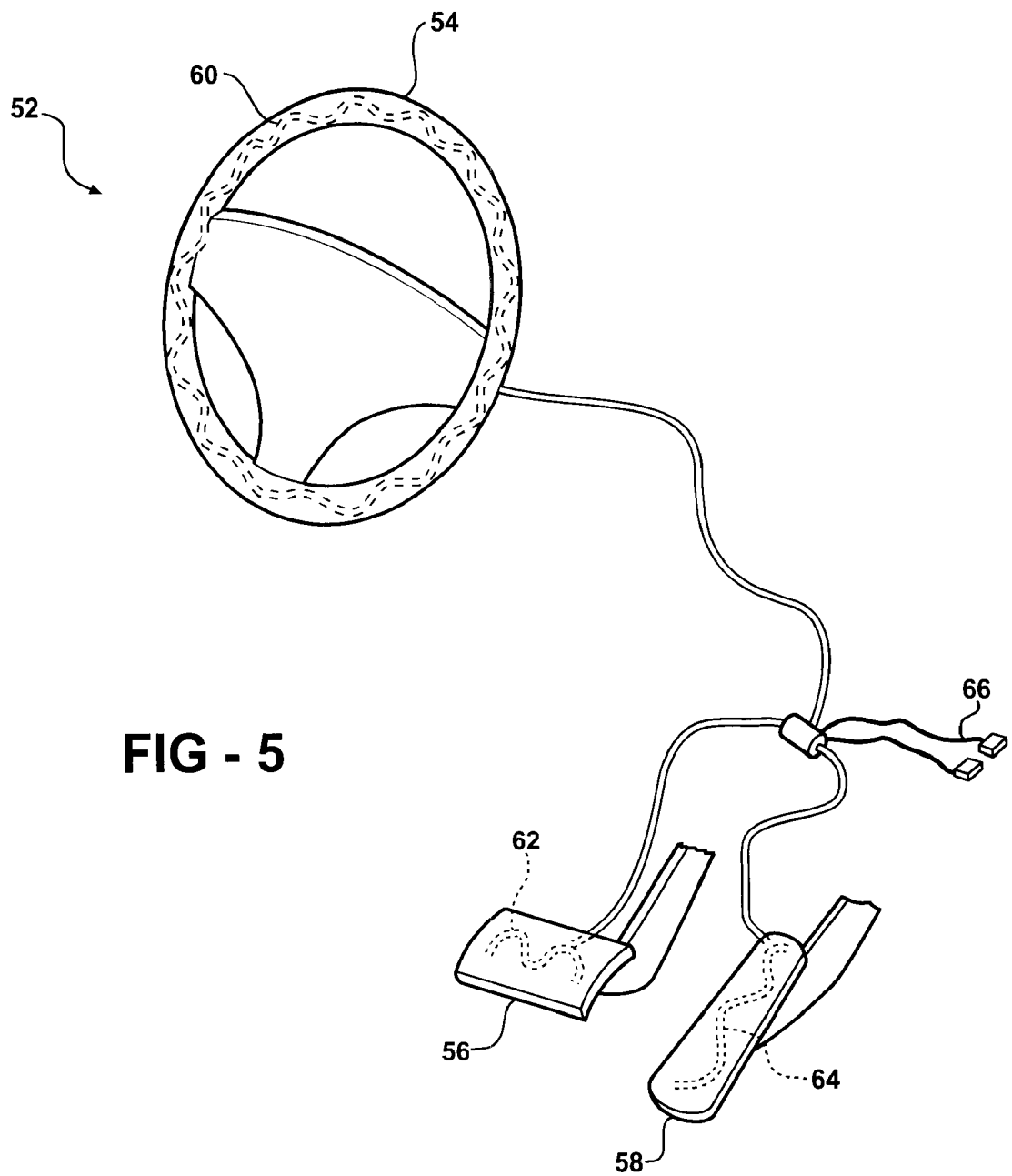
FIG. 5 is a further proposed variant in which resistance coil warming devices are incorporated within a steering column and foot acceleration and brake pedals of a vehicle.

Finally, and referring to FIG. 5, a further variant 52 of the present invention is illustrated in which the resistance heat warming pad is incorporated into the vehicle's steering wheel 54, brake pedal 56 and accelerator pedal 58. In each case, an exterior rubberized construction can be provided for each of the steering wheel 54 and pedals 56 and 58. In a preferred variant, it is contemplated that such rubber mat constructions can be sold as separate accessories and which are pre-sized to fit the associated components of different vehicle makes and models. Also built into covering fitted onto each of the steering wheel 54 and pedals 56 and 58 are resistance coils, reference specifically being made to coil 60 incorporated into the steering wheel 54 covering, and coils 62 and 64 incorporated into additionally configured rubberized mat coverings applied, respectively, to the brake 56 and accelerator 58 pedals.

The variant of FIG. 5 contemplates the ability of a vehicle operator (not shown) to maintain the warmth of the hands and feet without the need, in many instances, to activate the vehicles standard heater. This is particularly valuable to individuals who suffer from certain types of allergies and who may otherwise be susceptible to pollen or other contaminants included with a heated airflow.

Additional preferred variants also contemplate utilizing the present invention to provide air conditioning, as well as heating to the user. This may be accomplished with or without the use of the electrical inputs, and/or by routing cooled air through conduit formed in the mat layers. Other proposed features include the provision of an air flow nozzle incorporated into the assembly and which may direct either or both heated and cooled air in the direction of the user's feet.

Additionally, it is contemplated that the cord extending from the electrical heater mat construction can be provided with a splitter for permitting the user to both plug in the present device, as well as provide an input for the vehicle cigarette lighter and/or other appropriate electrical device, such as namely including a cellular telephone.

Having described my invention, additional preferred embodiments will become apparent to those skilled in the art to which it pertains and without deviating from the scope of the appended claims.

I claim:

1. A portable foot warming device for use with a vehicle, said device comprising:

a rubberized, heat transferring and electrically insulating pad having a specified three dimensional shape with a length, width and thickness, said pad further comprising a steering wheel pad, brake pedal pad and accelerator pedal pad;

an electrically conductive and resistant heat generating coil embedded within said pad and extending therethrough in a desired configuration;

a circuit unit attached to said pad and supplying said heat generating coil; and a cord extending from a voltage input to said circuit unit.

2. The foot warming device as described in claim 1, said pad including at least one rubberized layer of material.

3. The foot warming device as described in claim 2, a selected rubberized layer of material further comprising a reflective coating layer.

4. The foot warming device as described in claim 1, said rubberized pad further comprising first and second slippers each incorporating a separate resistance generating coil.

* * * * *